United States Patent [19]

O'Dougherty

[11] Patent Number: 4,615,798
[45] Date of Patent: Oct. 7, 1986

[54] AQUARIUM FILTER

[76] Inventor: Harold S. O'Dougherty, 534 Dryad Rd., Santa Monica, Calif. 90402

[21] Appl. No.: 716,453

[22] Filed: Mar. 27, 1985

[51] Int. Cl.[4] .......................... E04H 3/16; E04H 3/20
[52] U.S. Cl. .................................. 210/169; 210/221.2; 210/416.1; 210/416.2; 261/121 R
[58] Field of Search .................. 210/169, 416.1, 416.2, 210/220, 221.2; 119/5; 261/4, 5, 121 R, 121, 123, 124, 121 M

[56] References Cited

U.S. PATENT DOCUMENTS

| | | | |
|---|---|---|---|
| 2,782,161 | 2/1957 | Willinger et al. | 210/169 |
| 3,273,717 | 9/1966 | Canterbury | 210/169 |
| 3,321,082 | 5/1967 | Willinger | 210/169 |
| 3,854,450 | 12/1974 | Puckett | 119/5 |
| 4,077,877 | 3/1978 | Orensten et al. | 210/169 |
| 4,268,387 | 5/1981 | Hall | 210/169 |

Primary Examiner—Andrew H. Metz
Assistant Examiner—Sharon T. Cohen
Attorney, Agent, or Firm—Cislo, O'Reilly & Thomas

[57] ABSTRACT

An aquarium filter (10) is provided for filtering aquarium water and returning to the aquarium (16) a mixture of air and water. Water is taken from the aquarium by a demand flow syphon system (24) in which water flows into the aquarium filter of the invention as needed. The water is then forced to flow through filtering media, supported on a platform (38) and maintained in compartments (44, 46). The filtered water is introduced to the bottom (80) of a discharge tube (60) which includes a source of air (70). The air is used to pump the filtered water back to the aquarium. Prior to discharge into the aquarium, noise suppression means (94, 96) reduce the noise level of the air/water mixture. The aquarium filter of the invention is capable of operating at flow rates of 50 gal/hr and greater.

8 Claims, 5 Drawing Figures

AQUARIUM FILTER

BACKGROUND OF THE INVENTION

This invention relates to aquarium filters, and, more particularly, to a combination filter and aerator for use at high flow rates of 50 gal/hr and more.

Aquarium filters are well-known, and typically comprise means for introducing water to be filtered from the aquarium into the filter, means for filtering the water, and means for returning the filtered water into the aquarium. Filters may be mounted inside the aquarium or on the outside.

Exemplary of filters mounted on the outside include U.S. Pat. No. 3,273,717, issued to H. M. Canterbury on Sept. 20, 1966. In that combination filter and aerator, water is drawn by a pump from the aquarium into the filter through a suction tube, circulated through the filter and returned to the aquarium by means of a discharge tube. However, the electric motor driving the pump is included in the same housing as the filter, thereby providing the possibility of electric shock. Further, the flow rate is limited by the size of the electric motor, and the size of the motor is limited by the filter housing in which it is located.

Filters that employ air as the pump means are exemplified by U.S. Pat. No. 2,782,161, issued to H. W. Willinger et al on Feb. 19, 1957. That filter, mounted inside the aquarium, is limited in its pumping capability by the depth of the aquarium. Further, since the discharge tube exits vertically above the filter housing, it is clear that only limited circulation of the aquarium water can occur, thereby reducing the ability of the filter to remove all solid impurities and particulate matter in the aquarium.

There remains a need to provide an aquarium filter capable of handling a high flow rate of at least about 50 gal/hr substantially noiselessly.

OBJECTS AND SUMMARY OF THE INVENTION

It is an object of this invention to provide an aquarium filter capable of high flow rates on the order of 50 gal/hr and more.

It is another object of this invention to provide a means for controllably introducing air into the filtered water prior to its return to the aquarium to pump the filtered water into the aquarium and to aerate the water.

It is still another object of this invention to provide a means for suppressing any noise created by the air/water mixture during its return to the aquarium.

It is yet another object of this invention to provide a means for preventing solid impurities and particulate matter from settling in the aquarium and instead to create a circulating current in the aquarium water to direct such matter to the filter intake.

These and further objects of the invention will become apparent from the hereinafter following commentary taken in conjunction with the drawing.

In accordance with the invention, an improved aquarium filter is provided, comprising (a) means for controllably introducing air into the filtered water prior to its return to the aquarium to pump the filtered water into the aquarium, and (b) means for suppressing any noise created by the air-water mixture during its return to the aquarium. The air is mixed with the water at a level below the filter housing in a fashion that permits it to pump the filtered water out of the filter at a rate of at least about 50 gal/hr. The noise suppression means is provided near the end of the discharge tube, which itself is configured such that the angle at which the filtered water enters the aquarium is variable to establish the desired circulation of water in the aquarium.

DESCRIPTION OF THE BEST EMBODIMENTS CONTEMPLATED

Figure 1:
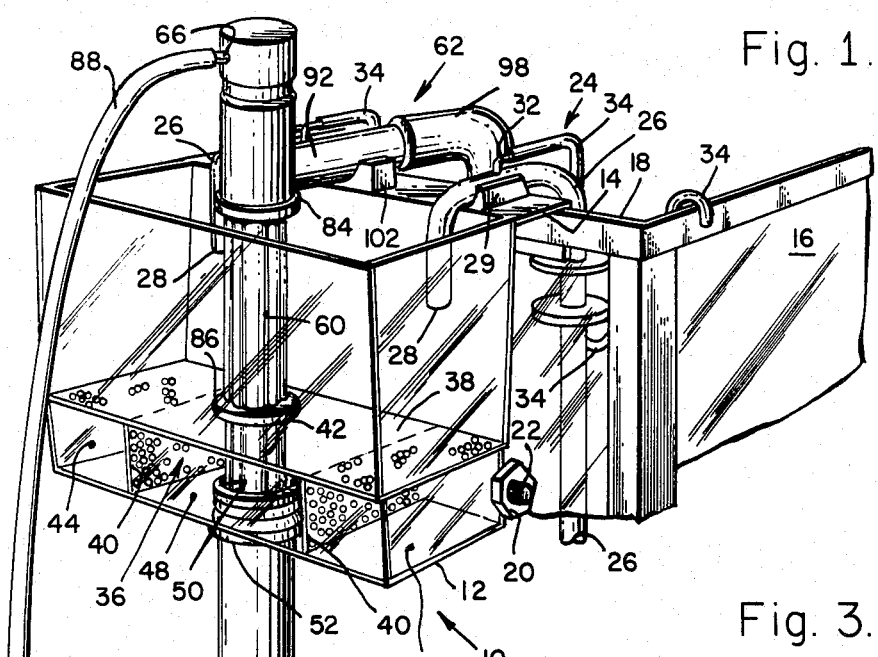
FIG. 1 is a perspective view of the aquarium filter of the invention attached to the side of an aquarium.

Referring to the drawing wherein like numerals of reference designate like elements throughout, aquarium filter 10 comprises a housing 12 and means 14 for attaching the housing to an aquarium 16, only a portion of which is depicted in the drawing. The housing 12 preferably comprises a clear plastic material, such as a poly(methyl methacrylate).

The attaching means 14 preferably comprises an extension of one side of the housing 12, formed into an inverted squared J-shape for convenient hooking over the top lip 18 of the aquarium 16. Spacing means 20 maintain the housing 12 such that the plane of its top surface is parallel to the plane defining the top of the aquarium. The spacing means 20 may comprise a hexagonal cam, as depicted in the drawing, with a knurled knob 22 for rotation to the proper position. Alternatively, other means, such as set-screws, may be employed to maintain the proper distance.

Means 24 for introducing water to be filtered from the aquarium into the aquarium filter of the invention are provided. The water intake means 24 comprises at least one, preferably two, inverted J-shaped tubes 26. The J-shaped tube 26 has an inlet end, submerged below the water level in the aquarium, with means (not shown) for preventing fish from being sucked into the tube. Such means may comprise a mesh filter, for example, with the mesh size small enough to keep fish out, but not so small as to unduly impede the flow of water therethrough. The J-shaped tube 26 also has a discharge end 28, which terminates in the aquarium filter. A support means 29 provides support for the J-shaped tube 26.

Means 30 for providing a syphon to maintain the flow of water from the aquarium into the aquarium filter are also provided. Such syphon means include an inverted L-shaped tube or nipple 32, which penetrates the inverted J-shaped tube 26 at its top-most portion 35, and a loop of flexible tubing 34, one end of which is attached to the L-shaped tube and communicates with the opening in the top of the inverted J-shaped tube 26 and the other end of which is available for applying suction to in order to initiate syphon action in the inverted J- shaped tube 26 or for applying positive gas pressure to in order to stop the syphon action.

The syphon employed in the invention is a demand system; water flows into the aquarium filter as needed. The method for inducing flow of water through the J-shaped tube comprises starting syphon action by evacuating the air from that portion 35 of the inverted J-shaped tube 26 above the aquarium water level with the filter end 28 of the tube either covered with a finger or submerged below the water level in the aquarium filter. The L-shaped tube 32, installed at the high point 35 of the syphon tube 26, and the tubing 34 attached to the L-shaped tube 32 are used in this operation. The flexible tubing 34 is routed down, then up, forming a loop 33 below aquarium water level. Air is drawn out of the syphon through the flexible tubing. Conveniently, a plastic squeeze bottle may be used to draw out the air. When completely evacuated, the drawing action is continued until the loop is filled with water from the syphon tube 26. This forms a trap which prevents air from re-entering the syphon tube 26 when the squeeze bottle is withdrawn. To stop the syphon, water is expelled from the trap, again, conveniently employing the same squeeze bottle.

Means 36 for supporting filter material comprises a horizontal platform member 38 and two vertical support members 40. The horizontal platform member 38 supports gravel of the variety commonly employed in aquarium filters, and includes an opening 42, through which discharge tube 60 passes. The vertical support members 40 are attached to the bottom of the horizontal platform member 38 a predetermined distance from the ends of the platform, and, in conjunction with the housing 12, define three spaces, two of which, 44 and 46, are intended to hold charcoal of the variety commonly employed in aquarium filters. The third space 48 serves to collect filtered water. This is accomplished by providing the vertical support members 40 with a plurality of perforations, as well as those portions of the horizontal platform member 38 that extend laterally beyond the line of attachment of the vertical support members 40 to the bottom of the horizontal platform member 38. The perforations are sized to permit water to flow therethrough, but to prevent the passage of any filter material. As may be appreciated, the only way in which water enters space 48 is to pass through the gravel, through the perforations in the horizontal platform member 40, through the charcoal in spaces 44 and 46 and through the perforations in the vertical support members 40. Consequently, it is not possible for water to return to the aquarium without being filtered, as is otherwise the case with certain other aquarium filters.

There are many configurations which the filter support means 36 may take. For the sake of clarity, the filter support means, which in front elevational view looks like the Greek letter "pi", is depicted in FIG. 1 as being of one piece construction. However, for ease of changing filter material without dismantling the entire filter assembly of the invention, the pi-shaped filter support means may comprise three parts: one part being a U-shaped member comprising the two vertical support members 40 and the unperforated portion of the horizontal platform member 38 and the other two parts being the two perforated portions of the horizontal platform member 38. Suitable support means may be provided in the side walls of the filter housing and in each of the three parts to provide interlocking of the parts.

Figure 3:
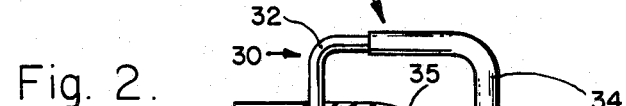
FIG. 3 is a cross-sectional view of the draft tube employed in the aquarium filter of the invention, taken along line 3—3 of FIG. 1.
Figure 3:
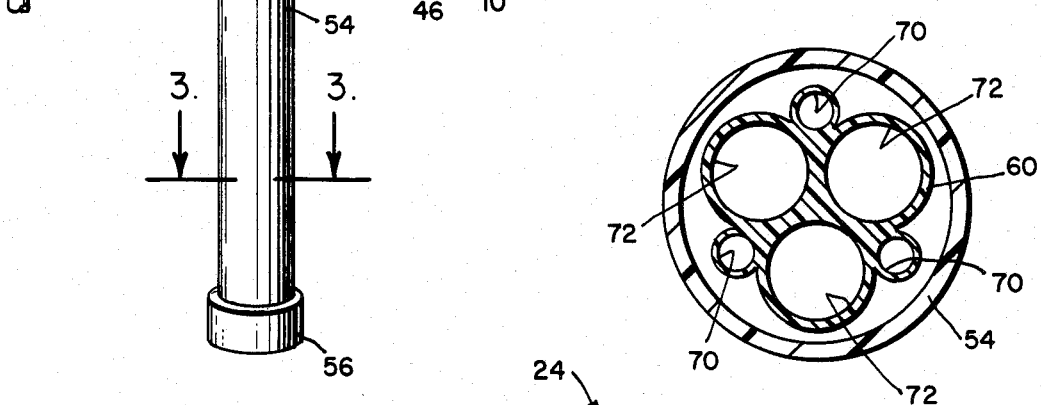
Figure 2:
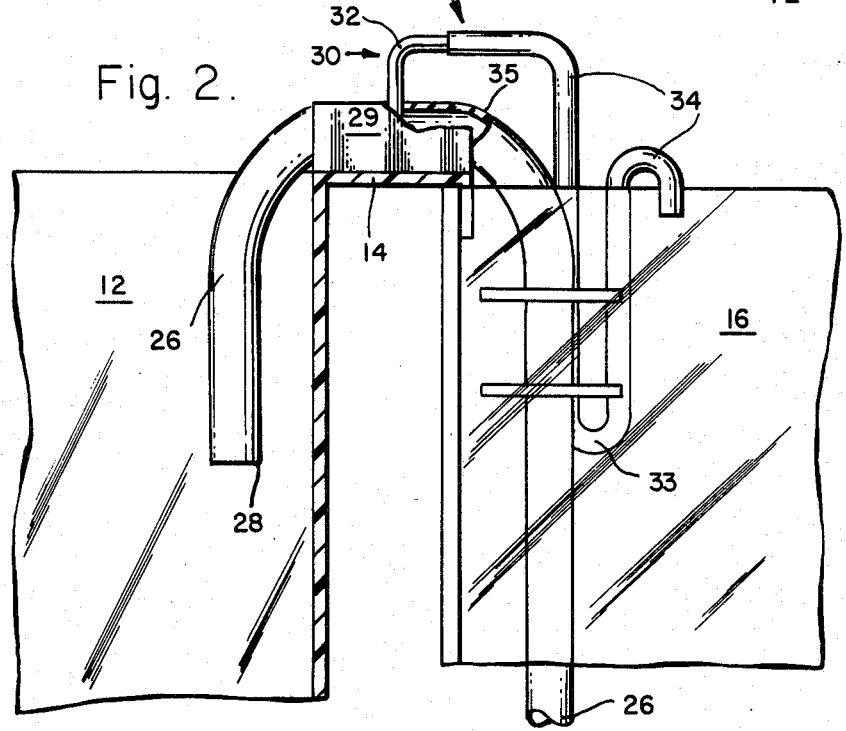
FIG. 2 is a side elevation view, showing one of the syphon tubes employed in drawing water from the aquarium into the aquarium filter of the invention.

As mentioned above, space 48 collects filtered water. The collected filtered water passes into exhaust port or well 50, defined by butt 52, which is a collar surrounding the well 50, or opening, provided in the bottom of the filter housing. A sheath 54 surrounds the discharge tube 60, providing clearance for the filtered water between the discharge tube 60 and the inside wall of the sheath 54. The top of the sheath 54 is attached to the collar 52. The bottom of the sheath 54 is provided with a cap 56. FIG. 3 is a cross-section view taken along the line 3—3 of FIG. 1, showing the relationship between the sheath 54 and the discharge tube 60. In one embodiment, the maximum OD of the discharge tube was $1\frac{1}{8}$ inch, while the ID of the sheath 54 was $1\frac{1}{2}$ inch, thus providing at least $\frac{3}{8}$ inch clearance.

Figure 4:
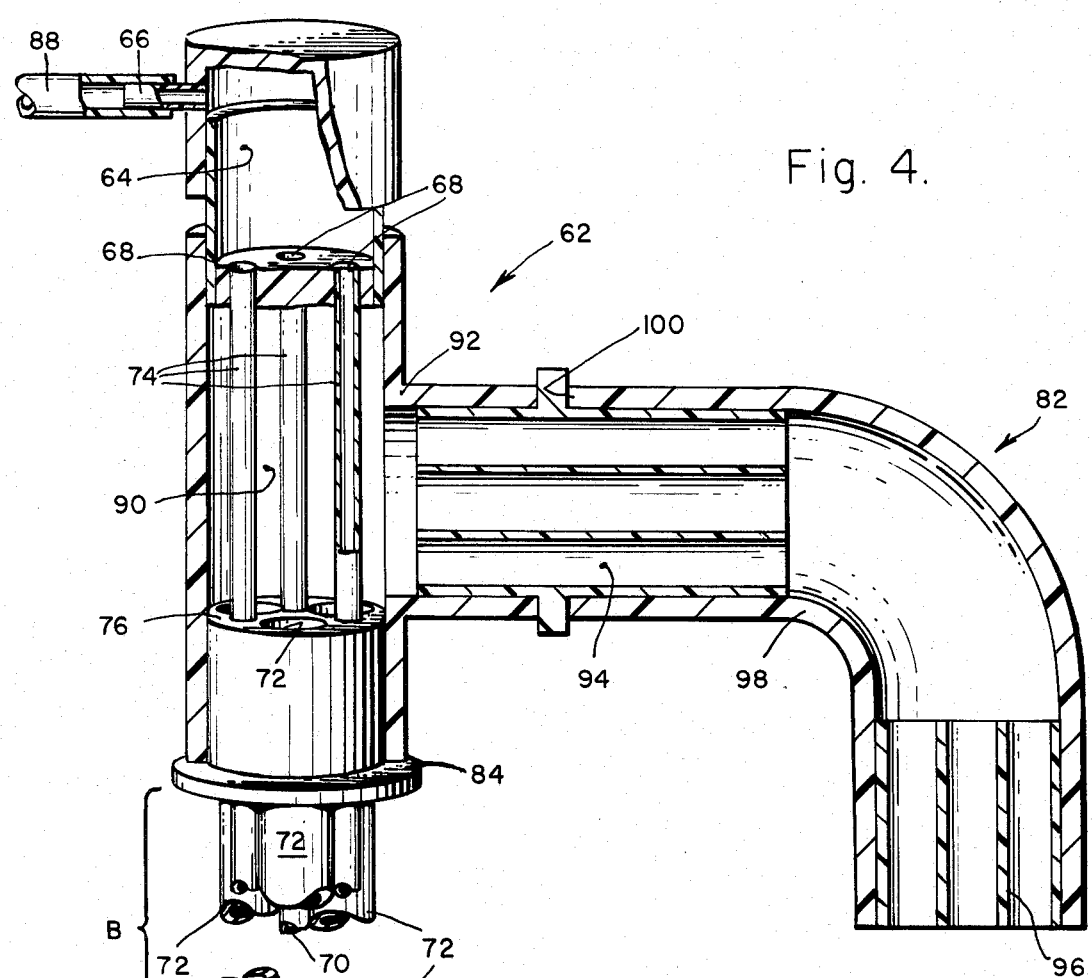
FIG. 4 is a detailed view, partly in section and partly broken away, showing the means for introducing air, mixing it with water and reducing noise created by the air-water mixture.

The distance A in FIG. 4 is that between the top of the platform 38 and the well 50.

Figure 5:
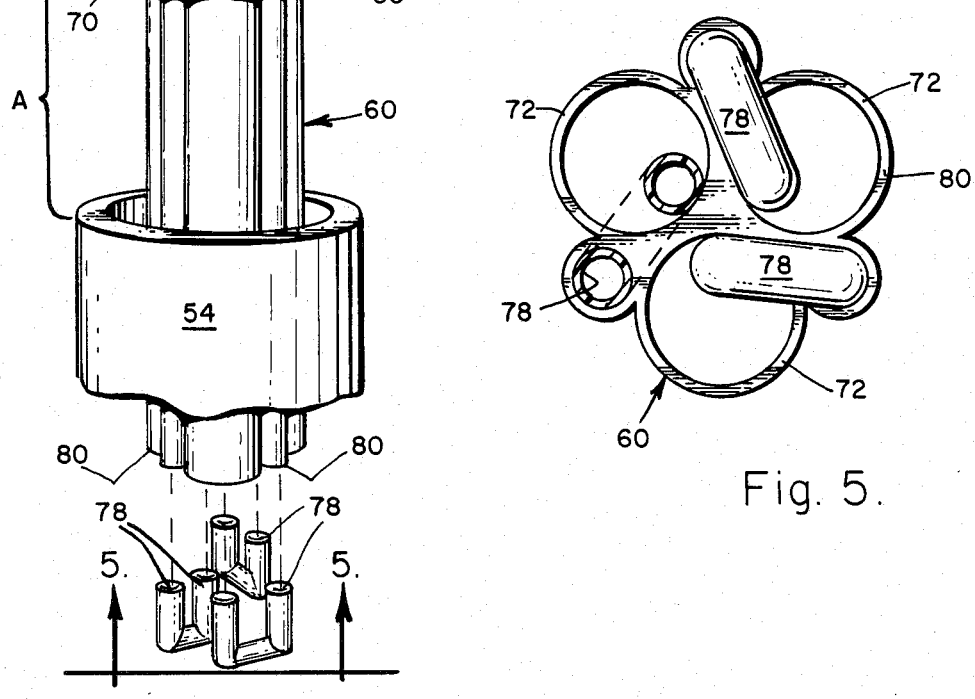
FIG. 5 is a plan view, partly in section, taken along the line 5—5 of FIG. 4, looking at the bottom of the draft tube.

A discharge assembly 62 is provided which includes the following elements: an air distributor 64 having an inlet 66 and at least one outlet 68, the discharge tube 60 comprising air intake means 70 and water discharge means 72, and means 74 for communicating between the air distributor outlet 68 and the top 76 of the discharge tube 60. Means 78 are provided for communicating between the air intake means 70 and the water discharge means 72 at the bottom 80 of the discharge tube 60, and means 82 for directing the filtered water back into the aquarium, as shown in FIGS. 4 and 5.

The distance B in FIG. 4 is the distance between the bottom of the discharge assembly 62 and the top of the platform 38. Collar 84 is an adaptor between the discharge tube 60 and T-section 92. Collar 86, which rests against the top of platform 38, provides support for the discharge tube 60. A cover (not shown), conveniently made of thin plastic that is at least semi-rigid, is fashioned to slide from the back of the aquarium filter toward the aquarium side, having U-shaped cut-outs to accommodate the T-section 92 and the syphon tubes 26.

In operation, air is supplied by a pump means (not shown) to the air distributor 64 through inlet 66. A tube 88 connects the air pump with the inlet 66. The air passes through the outlet 68 into the air intake means 70, and at the bottom 80 of the discharge tube 60 enters the water discharge means 72 by way of means 78. Filtered water, which has passed down the outside of the discharge 60 is entrained on the air and is pumped up through the water discharge means 72. In chamber 90, the air/water mixture terminates its upward flow and is directed by T-section 92 out through the means 82 for directing the filtered water back into the aquarium.

Although at least one each of the air intake means 70 and water discharge means 72 have been described, the discharge tube 60 preferably comprises three of each, as shown in the cross-section in FIG. 3. Such a discharge tube as depicted therein is conveniently fabricated by extrusion, employing a conventional plastic material. PVC is an example of such a material. In one embodiment, the discharge tube 60 comprised three air intake tubes 70, each of 3/16 inch ID, and three water discharge tubes 72, each of $\frac{1}{2}$ inch ID. Two syphon tubes 26 of 0.68 inch ID were employed in conjunction with this discharge tube.

The filtered water passes through a noise suppression means. Shown in FIG. 4 are two noise suppression sections 94 and 96, provided on each side of elbow joint 98. The noise suppression sections comprise a plurality of tubular portions parallel to the water flow. The plurality of tubular portions have been found to reduce and suppress noise of the air/water mixture as it returns to the aquarium. Preferably, eight tubular portions in each section provide suitable noise suppression.

The bubbling action of the aquarium filter without the noise suppression elements produces objectionable noise levels in the high frequency range, especially at increased flow rates. The two stage attenuation system described above compartmentalizes the air/water flow stream into a number of smaller vibrating segments over its active length (in one embodiment, the length of each element was two inches). This both lowers the pitch and dampens the intensity of the noise in somewhat the same manner as an automobile exhaust muffler.

The means 82 for directing the filtered water back into the aquarium is provided with the capability for rotating about the end 100 of the elbow joint 98. This arrangement prevents settling of solid impurities and particulate matter in the aquarium. Instead, such matter is kept in circulation in the aquarium until it reaches the intake portion of the inverted J-shaped tubes 24. The elbow joint 98 may be positioned at any angle less than 90° with respect to the plane of the water in the aquarium and greater than 0°. Simple experimentation will determine the optimum angle for a particular aquarium design. A saddle block 102 supports the horizontal portion of the T-section 92.

Of central significance to the operation of the aquarium filter of the invention is the length of the discharge tube 60 between the height of the water in the aquarium 16 and the end 80 of the discharge tube, that is, the depth of the tube. All other things being equal, the flow rate has been found to increase with increasing length of the discharge tube. However, beyond a certain length (easily determined by experimentation for a given discharge tube length), the water flow will diminish, since the air flow for any given air pump is an inverse function of the pressure head at the delivery end and will ultimately diminish to zero. This use of air to entrain the water is much like the use of a chimney for a fireplace: the higher the chimney (up to a point), the better the draft.

In order to maintain the high flow rates desired (on the order of 50 gal/hr and greater), the bottom of the discharge tube 60, as represented by the cap 56, may lie below the base of the aquarium being filtered. This is easily accommodated either if the aquarium is on a stand or if the side of the aquarium holding the filter is located close enough to the edge of the supporting table or bench to permit the overhang.

A flow meter has been developed for use with the type of aquarium filter disclosed and claimed herein. The flow meter is based on a differential level measurement. This flow meter enables the more serious hobbyist to regulate the filter output for specific requirements based on aquarium geometry and number of fish. Essentially, it measures the difference between the aquarium and filter fluid levels. This is a direct function of syphon flow rate and thus must be calibrated for each syphon configuration used (number of syphon tubes and ID of syphon tube).

Thus, there has been disclosed an aquarium filter for use at high flow rates of 50 gal/hr and more. Various modifications and changes will make themselves available to those of ordinary skill in the art, and all such changes and variances not deviating from the spirit and essence of the invention are intended to be covered by the appended claims.

What is claimed is:

1. An aquarium filter operatively adapted for association with an aquarium for continuously removing water from said aquarium, filtering said water and returning said water to said aquarium comprising:
   (a) a housing with an opening in the bottom thereof, said housing provided with means for attachment thereof to the outside of said aquarium along one side thereof in cooperative relationship;
   (b) removable support means maintained within said aquarium filter for supporting filtering material for filtering out particulate matter and the like from said water, said support means including means defining a chamber in the vicinity of said opening, said chamber configured to receive only filtered water;
   (c) at least one inverted J-shaped tube cooperatively associated with said aquarium and said aquarium filter and disposed therebetween in interconnective relationship, said J-shaped tube adapted for introducing said water from said aquarium into said aquarium filter, said J-shaped tube having an inlet end and a discharge end, said inlet end submerged in said aquarium and said discharge end terminating in said aquarium filter, with means provided on said J-shaped tube for providing a syphon action to maintain flow of said water from said aquarium into said aquarium filter;
   (d) a plurality of vertically disposed inner tubes cooperatively associated with said aquarium filter for collecting filtered water and returning said filtered water to said aquarium, said plurality of inner tubes comprising a first set of tubes adapted to convey air and a second set of tubes adapted to convey a mixture of air and said filtered water, said plurality of inner tubes extending from above said aquarium filter to below said aquarium filter, passing through said opening in said bottom of said aquarium filter and further including:
      (1) an air distributor wherein the top of said air conveying tubes terminate, for introducing air under pressure through a controlled orifice to said first set of inner tubes,
      (2) a vertically disposed outer tube mounted in said opening in said bottom of said aquarium filter in sealing relationship and extending downwardly therefrom, surrounding said plurality of inner tubes and provided with means inside said aquarium filter and near said bottom thereof to permit filtered water to enter said outer tube,
      (3) a collection chamber wherein said outer tube and said plurality of inner tubes terminate to collect said filtered water in said outer tube and to permit egress of same into said second set of inner tubes,
      (4) means in said collection chamber for communicating between said first set of inner tubes and said second set of inner tubes to entrain said filtered water by said air, and
      (5) a discharge chamber beneath said air distributor for collecting the mixture of said air and said filtered water, said discharge chamber provided with a discharge means for returning said mixture of said air and said filtered water into said aquarium; and
   (e) noise suppression means including a plurality of inner tubes mounted in said discharge means for suppressing any noise generated by said mixture of said air and said filtered water during its return to said aquarium.

2. The aquarium filter of claim 1 including adjustable means for ensuring substantially parallel alignment of said housing of said aquarium filter with said aquarium.

3. The aquarium filter of claim 1 further including means for preventing solid impurities in the aquarium from settling before being syphoned into said housing by providing a circulating current in said aquarium, said means including a provision for introducing filtered water to said aquarium at an adjustable angle to the surface of the water therein.

4. The aquarium filter of claim 1 wherein said syphon means comprises a loop of tubing, the bottom of which is positioned below the level of water in said aquarium, one end of said tubing connected to a nipple on the top of said J-shaped tube, said nipple communicating with the interior of said J-shaped tube, the other end of said tubing adapted to receive means for providing suction so as to fill said loop with water and initiate syphoning action.

5. The aquarium filter of claim 1 wherein said means for supporting filter material comprises a removable pi-shaped platform comprising a top surface and two downwardly depending support portions positioned a distance in from the ends of the platform, the pi-shaped platform dimensioned with respect to said housing such that when placed in said housing, said platform defines the bottom of an upper compartment for supporting a first filter material and the downwardly depending support portions in conjuction with that portion of the top surface extending therebeyond defining two lower compartments for supporting a second filter material, the center of said platform being provided with an opening to receive said discharge tube, and the downwardly depending support portions and the portions of the top surface extending therebeyond provided with perforations so as to permit water flow therethrough.

6. The aquarium filter of claim 1 wherein said plurality of inner tubes comprises a first set of three tubes, adapted to convey air, and a second set of three tubes, adapted to convey air and water.

7. The aquarium filter of claim 1 wherein said noise suppression means includes two tubes for discharging said mixture of air and filtered water into said aquarium, each tube disposed on either side of an elbow and containing eight smaller tubes disposed therein, said elbow capable of rotation about an axis such that the angle of entry of said mixture of air and filtered water into said aquarium may be varied.

8. The aquarium filter of claim 1 wherein said air distributor includes means for connecting to a supply of air.

* * * * *